United States Patent [19]
Barrett

[11] Patent Number: 5,592,177
[45] Date of Patent: Jan. 7, 1997

[54] POLARIZATION-ROTATION MODULATED, SPREAD POLARIZATION-ROTATION, WIDE-BANDWIDTH RADIO-WAVE COMMUNICATIONS SYSTEM

[75] Inventor: Terence W. Barrett, Vienna, Va.

[73] Assignee: Autometric, Incorporated, Alexandria, Va.

[21] Appl. No.: 75,271

[22] Filed: Jun. 11, 1993

[51] Int. Cl.⁶ .......................... H01Q 21/06; H01Q 21/24; H04B 7/10
[52] U.S. Cl. .............................................. 342/361
[58] Field of Search .................................. 342/361, 362, 342/363, 364, 365, 366

[56] References Cited

U.S. PATENT DOCUMENTS

| | | |
|---|---|---|
| H484 | 6/1988 | Holliday ................................ 342/201 |
| 3,483,559 | 12/1969 | Korzekwa et al. . |
| 3,540,045 | 11/1970 | Taylor . |
| 4,084,137 | 4/1978 | Welti . |
| 4,198,641 | 4/1980 | Gibson . |
| 4,512,024 | 4/1985 | Gutleber . |
| 4,521,878 | 6/1985 | Toyonaga . |
| 4,968,969 | 11/1990 | Drabowitch et al. ................... 342/188 |
| 5,068,668 | 11/1991 | Tsuda et al. . |

*Primary Examiner*—Theodore M. Blum
*Attorney, Agent, or Firm*—Jim Zegeer, Esq.

[57] ABSTRACT

A wide bandwidth radio wave communication system having a dual feed pair of cross-polarized antennas having a common axis and being at orthogonal angles to each other. A source of RF signals is coupled to the antennas and a shifter device is between at least one of the pair of cross-polarized antennas and the source of RF signals for modulating the polarization of RF signals launched by the pair of cross-polarized antennas.

7 Claims, 8 Drawing Sheets

FREQUENCY SPECTRA WITH INCREASING FREQUENCY
DEVIATION AND CONSTANT POLARIZATION MODULATION.

f(t)=Esin($\omega$t + msin$\pi$t), WHERE m is the modulating index.

FIG. 10A

FREQUENCY SPECTRA WITH CONSTANT FREQUENCY DEVIATION BUT
VARIABLE POLARIZATION MODULATION.

POLARIZATION-ROTATION MODULATED, SPREAD POLARIZATION-ROTATION, WIDE-BANDWIDTH RADIO-WAVE COMMUNICATIONS SYSTEM

BACKGROUND OF THE INVENTION

The present invention relates generally to a special class of wide bandwidth—yet not wide frequency bandwidth—communications systems which are spread polarization—yet not spread frequency spectrum. The invention utilizes a bandwidth—the polarization modulation bandwidth—which is presently under utilized for communications purposes. The invention, in one method of application, also relates to the use of this wide polarization bandwidth in systems requiring only small-sized, in contrast to large-sized antennas. The present invention, also describes a method for obtaining wide (polarization) bandwidth communications using dual-feed orthogonally polarized antennas, both of narrow frequency bandwidth, to provide a broad-polarization bandwidth for transmission/reception after Launch from the antennas. With respect to antennas, which transmit/receive waves of one polarization (unipolarized), and receivers unmatched in polarization to tile signals from systems of the present invention, such signals are spread polarization, as opposed to spread (frequency) spectrum.

It is an object of the present invention to provide a communications system which is dependent on two orthogonally polarized antennas to provide one polarization modulated wave.

It is a further object of the present invention to provide polarization modulation communications rather than the phase modulation communications of prior art which require only one broad-band antenna for transmit or receive, which are of one or few static polarizations, and which create and utilize large frequency bandwidths. Such an antenna of prior art which is of one or few static polarizations, whether linearly, circularly, or elliptically polarized, will be referred to as unipolarized.

It is a further object of the present invention to provide a spread polarization communications system. There are two modes of functioning of the present invention: the analog polarization modulation mode and the hopping polarization modulation mode. Unlike spread (frequency) spectrum systems of prior art, the spread polarization system of the present invention in the hopping mode is spread in polarization and temporal bandwidth, in contrast to frequency bandwidth. As a communications system of the present invention is spread in polarization, and as the majority of communications antennas of prior art are unipolarized (single polarization samplers), then the polarization modulated signals of the present invention will be spread polarization to such antennas.

It is a further object of the present invention to provide a communications system in which phase changes and modulations in the emitted signal occur between signals from two orthogonally polarized emit/receive antennas. This object can be contrasted with phase changes and modulations occurring in signals of prior art which are phase changes between two waves of the same polarization so that the resultant modulated wave is of the same polarization. In the case of polarization modulation in communications systems of the present invention, the phase changes occurring with phase modulation are between two waves (or antennas) of orthogonal polarization, and the resultant launched wave is of a changing (nonstatic) polarization and different from that of the two constituent waves (except under certain trivial conditions—e.g., one or other of the constituent waves being zero). A specific advantage in using phase modulation of orthogonally polarized waves producing polarization modulation and omnipolarized waves as in the present invention, as opposed to phase modulation of unipolarized waves producing unipolarized waves of prior art, is that as the conventional antenna systems of communications systems of prior art are unipolarized, polarization modulated communications systems of the present invention present a signal spread in polarization to reception by those conventional antenna systems. In contrast, phase modulated systems of prior art are unspread in polarization to other systems of prior art.

It is a further object of the present invention to provide a communications system in which signal rotation of the polarization axis with respect to a ground-plane is controlled, so that, together with polarization changes, two-dimensional trajectories on a Poincaré sphere representation (FIG. 1.) are possible for the carrier signal.

It is a further object of the present invention to provide both analog and hopping polarization modulated communications systems. Analog polarization modulated signals of the present invention require at least one antenna which is broad band. Polarization hopping modulated signals are constituted of two individual signals which can be narrow in frequency bandwidth (although broad in polarization bandwidth). In the case of polarization hopping communications systems of the present invention: (i) there is minimum interference to other receivers; and (ii) narrow-band and small antennas can be used. There are many advantages to using small, miniaturized antennas. Miniaturized antennas can be obtained by the application of dielectric-ferrite cladding (cf. Chatterjee, 1985; Fujimoto et al, 1987). However, short antennas obtained by these methods have disadvantages, one of which is a resulting high Q (narrow bandwidth). The present invention, in its polarization hopping mode, utilizes two short orthogonally polarized antennas of high Q but the polarization hopping creates a large polarization bandwidth sequentially.

The above and other objects of the invention are achieved in a communications system the signals of which can be represented as a path or changing locations or trajectories on a Poincaré sphere (FIG. 1), where the lines of longitude refer to changes in polarization and lines of latitude refer to rotation. In this representation, a movement on the surface of the sphere can represent changes in both polarization and rotation (FIG. 2).

Means are described for generating spread polarization signals which are M-ary with respect to the carrier, and binary with respect to the signal. For example, in the polarization hopping mode of function, suppose at some instant that the carrier's instantaneous polarization is, e.g., 256°, and the carrier's instantaneous rotation is, e.g., 148°, then a "1" and "0" for the informational encoding is 256°+90° and 256°−90° at instantaneous rotation 148°. At a subsequent instant the carrier's instantaneous polarization might be, e.g., 268°, and the carrier's instantaneous rotation might be, e.g., 156°, then a "1" and "0" for the informational encoding, now, is 268°+90° and 268°−90°, respectively, at instantaneous rotation 156°. Thus, in this instance, the polarization-rotation modulation method is M-ary with respect to the carrier, but binary with respect to the time domain informational sequencing.

Means are described for generating spread polarization signals which are M-ary with respect to the carrier, and M-ary with respect to the signal. For example, in the polarization hopping mode of function, suppose at some instant that the carrier's instantaneous polarization is, e.g., 256°, and the carrier's instantaneous rotation is, e.g., 148°, then the informational encoding is 256°+i° and 256°−i° at instantaneous rotation 148°+j° and 148°−j°, i=$x_1, x_2, x_3, \ldots$ degrees, j=$y_1, y_2, y_3, \ldots$ degrees. At a subsequent instant the carrier's instantaneous polarization might be, e.g., 268°, and the carrier's instantaneous rotation might be, e.g., 156°, then the informational encoding, now, is 268°+i° and 268°−i°, respectively, at instantaneous rotation 156°+j° and 156°−j°, i=$x_1, x_2, x_3, \ldots$ degrees, j=$y_1, y_2, y_3, \ldots$ degrees. Thus, in this instance, the polarization-rotation modulation method is M-ary with respect to the carrier and also M-ary with respect to the time domain informational sequencing.

Furthermore, the signal of the present invention is spread not only in the time domain, i.e., $CAR_{TD}$, but also in the polarization-rotation domain, $CAR_{PR}$. This means that the same codes, e.g., direct sequence, linear congruence, quadratic congruence, optical, etc. (cf. Titlebaum, 1981; Titlebaum & Sibul, 1981; Bellegarda & Titlebaum, 1988, 1991a, b; Titlebaum et al, 1991; Drumheller & Titlebaum, 1991; Maric & Titlebaum, 1992; Maric & Titlebaum, 1992; Chung et al, 1989; Chung & Kumar, 1990; A et al, 1992), can be used in the polarization-rotation modulation technique as with conventional frequency hopping and time hopping systems. Therefore the polarization-rotation modulation technique of the present invention is more spread, or covert, than prior art.

A high processing gain PG is defined, as:

$$PG = BW_{RF}/R_{info}$$

where the RF bandwidth $BW_{RF}$ is the bandwidth of the transmitted spread signal; and $R_{info}$ is the data rate. Frequency and time spread spectrum signals produced by techniques of prior art achieve a large increase in $BW_{RF}$ by four methods: (1) using a frequency domain code, which increases the frequency bandwidth, $BW(CAR_{FD})$, by hopping between narrow frequency bandwidth allotments, or by changing phase; or (2) using a time domain code, which increases the sequential bandwidth, $BW(CAR_{TD})$, by hopping between narrow time bandwidth allotments, e.g., by pulse position modulation; (3) using an ultrashort pulse which is of wide frequency bandwidth, and (4) combinations of (1), (2) and (3) (cf. Simon et al, 1985; Dixon, 1984). The polarization-rotation technique of the present invention using trajectories in polarization-rotation space represented on the Poincaré sphere permit an increase in another bandwidth, $BW(CAR_{PR})$, so that the total bandwidth increase is given by:

$$BW_{RF} = BW(CAR_{PR}) \times BW(CAR_{TD}).$$

For example, using conventional assumptions, in the case of prior art the RF bandwidth can be approximately 0.88 times the bandwidth-spreading code clock rate of, e.g., $10^7$ Hz. With a 3 KHz information rate, the process gain is $BW(CAR_{TD}) = (0.88 \times 10^7)/(3 \times 10^3) = 2933.3$ or 35 db. In comparison, if a polarization hopping system takes ten steps to traverse a trajectory on the Poincaré sphere, if this is accomplished in ten changes in polarization and ten changes in rotation, and if the trajectory is repeated at a rate of 10 Hz, then the spread polarization-rotation bandwidth, $BW(CAR_{PR})$, is 1000. If all other variables, e.g., the coding and code clock rates, are the same as in the case of systems of prior art, the total RF bandwidth is then 1000×BW-$(CAR_{TD})$, i.e., the polarization modulation PG is 65 db compared with 35 db for the case of systems of prior art. These modest figures are intended only for comparison—larger $BW(CAR_{PR})$s are achieved with faster polarization and rotation modulators—and similar exercises can be performed on other conventional codes. In all instances the polarization-rotation technique of the present invention will always provide superior processing gain.

Means are described for generating increased bandwidths and covert communications using advanced forms of the polarization-rotation technique of the present invention. Carrier trajectories (on the Poincaré sphere) are not only obtainable with polarization-rotation modulations: dφ/dt= constant; dr/dt=constant; but also with dφ/dt=f(t); dr/dt=f(t); and also $d\phi''/dt''$=constant; $dr''/dt''$=constant; and $d\phi''/dt''$= f(t) and $dr''/dt''$=f(t), n=1,2, ... This permits large numbers of codes and polarization-rotation spreading for the (polarization-rotation) carrier, $CAR_{PR}$—quite apart from the codes for the time domain sequencing carrier, $CAR_{TD}$.

In summary, the invention provides:

Communications with high processing gain and noninterfering communications utilizing unused bandwidths.

Extremely spread polarization communications which are noninterfering with present spectrum users.

Use of small, light-weight, narrow-band, antennas in the polarization hopping mode.

Large numbers of noninterfering codes.

Covert, low-probability of intercept communications.

Low probability of decode if intercepted communications.

SUMMARY OF THE INVENTION

Briefly, the component elements of the present invention are as follows.

1. Dual-feed orthogonally polarized antennas consisting of a referent antenna of narrow-frequency bandwidth together with a narrow bandwidth orthogonally polarized antenna providing a broad polarization-rotation modulation bandwidth.

2. A relatively lossless, dispersionless delay line providing phase delays of fractions of a degree and cross-correlation capabilities to detect those fractions. Instantaneous phase changes over small intervals of time are transmitted and received by means of two small, high Q, antennas in the polarization hopping mode. In the analog continuous mode the instantaneous changes dφ/dt or $d^n\phi/dt^n$ are transmitted and received by means of one small high Q antenna and one larger, higher Q antenna. In the hopping mode the sampling and transmission is of the absolute discrete phase differences $\Delta\phi_1, \Delta\phi_2, \Delta\phi_3, \ldots$ at set intervals.

3. A method of changing the orientation of one antenna with respect to the other, providing rotations, ψ, of the polarization plane.

4. Four bandwidths are used in a system of the present invention: (i) the frequency bandwidth which is narrow; the (ii) polarization bandwidth which is wide and either continuous analog or polarization hopping; (iii) the rotation bandwidth; and (iv) the temporal or time hopping bandwidth. The high polarization sampling bandwidth permits a large number of discriminations, $\Delta\phi_i$, i.e., a large number of code elements.

5. The channel signalling rate is determined by the Q of the antennas used. Correlator performance sets the length of the signal repertoire ($\Delta\phi_1, \Delta\phi_2, \Delta\phi_3, \ldots$). 20 Gigabits/sec. correlators are available with present technology. Thus the channel capacity of a communications system of the present invention is high because of both the signaling rate and also due to the high number of code elements.

6. A communications system of the present invention can be used for indirect communications as well as point-to-point, provided that the polarization-rotation conditioning changes resulting from surface reflections are known. In the case of indirect communications, a test signal must be transmitted to a receiver to probe surface polarization conditioning-rotation so that receiver compensations in the carrier can be made.

BRIEF DESCRIPTION OF THE DRAWINGS

FIG. 11.(A) is a representation of a short duration spread polarization pulse below the signal threshold for detection by frequency domain receivers.

DETAILED DESCRIPTION OF THE PREFERRED EMBODIMENT

Figure 1:
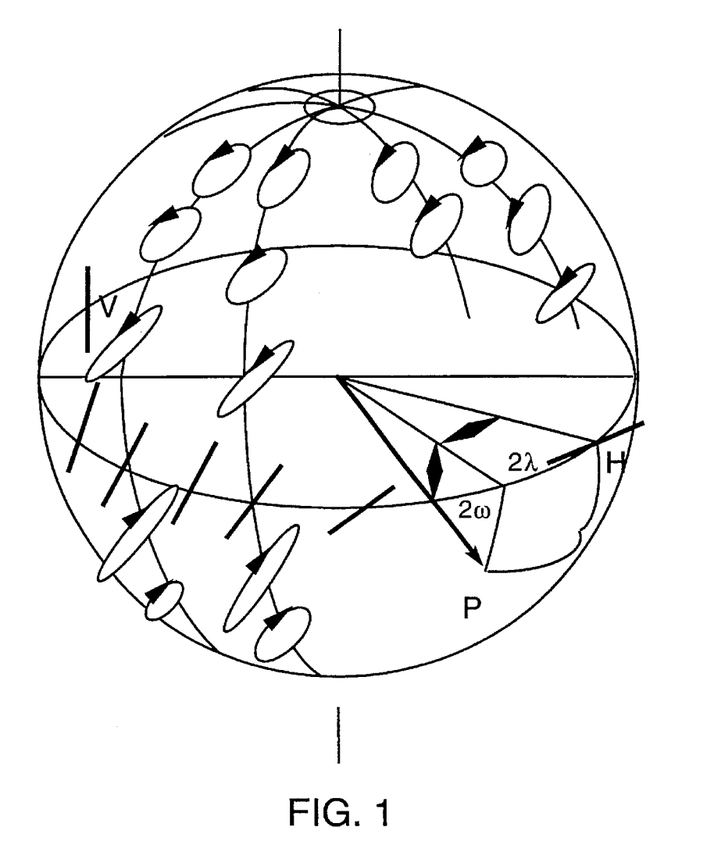
FIG. 1. Poincaré sphere representation of wave polarization and rotation.
Figure 2:
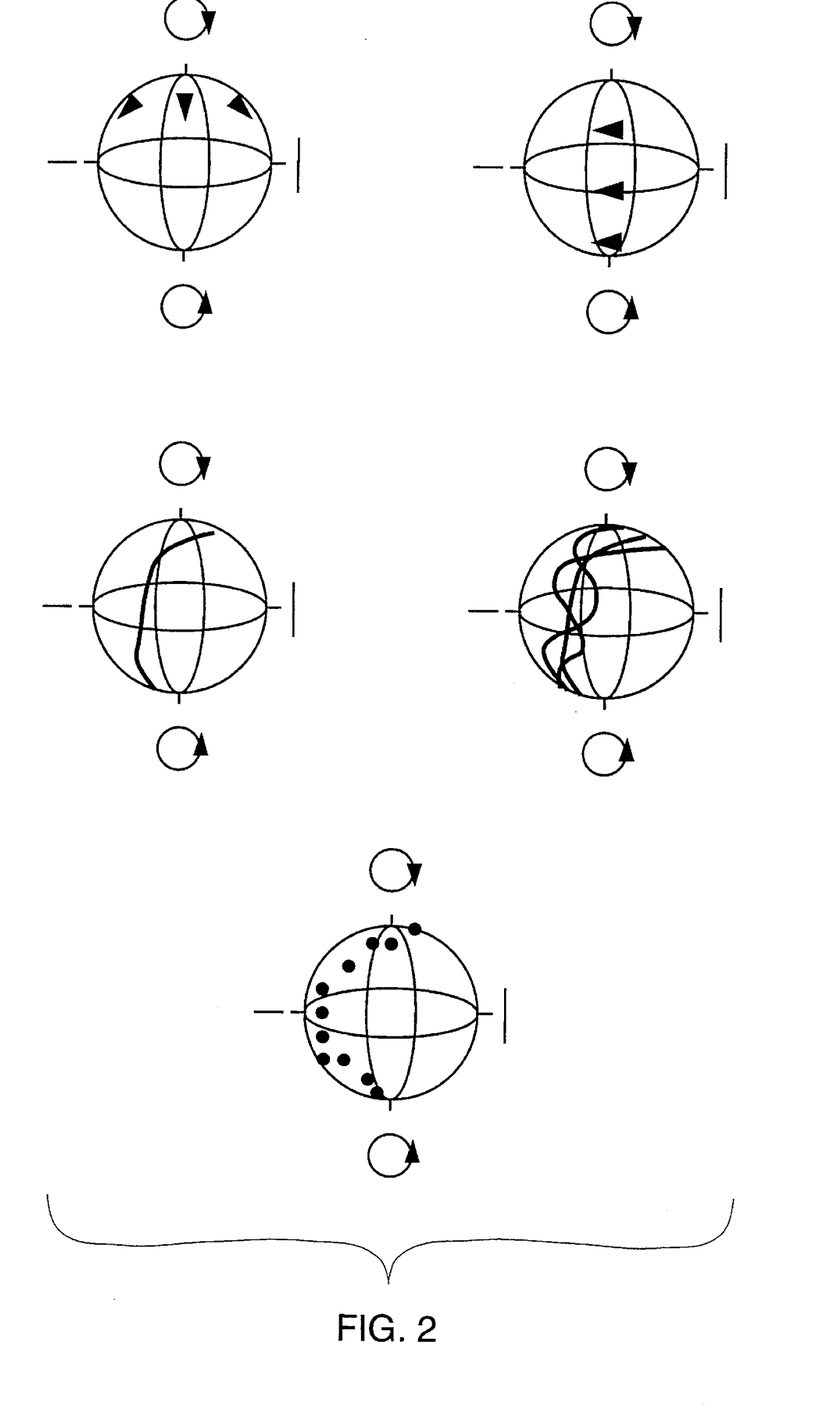
FIG. 2.A: Changes in the longitudinal direction indicate changes in polarization or phase between two orthogonally polarized waves with respect to the summed wave; B: changes in the latitudinal direction indicate changes in the rotational axis of the summed wave; C: an arbitrary (analog) trajectory on the Poincaré sphere; D: several arbitrary (analog) trajectories; (E) the analog trajectory of C shown as a hopping trajectory.

Referring to FIG. 1, the longitudinal lines represents polarization, the latitudinal lines the polarization axis. The "north pole" represents circularly polarized contrarotating; the "south pole", circularly polarized corotating. The "equator" represents linearly polarizations. In between the "poles" and the "equator" are representations of elliptical polarizations, controtating in the case of the "northern hemisphere" and corotating in the case of the "southern hemisphere". The latitudinal lines represent the polarization axis. On the equator the polarization axis is rotated from linearly polarized vertically, to linearly polarized horizontally (right inclination). In traveling around the back of the sphere the rotation changes from linearly polarized vertyically, to linearly polarized horizontally (left inclination). A point representing a wave is shown at P, which is $2\omega$ degrees from linear polarization corotating and $2\lambda$ degrees in rotation from linearly polarized horizontal. A wave which is periodically modulated in both polarization and rotation is represented as a moving vector, P, traversing a trajectory which is a periodic path on the surface of the sphere. The trajectory, periodic in polarization and rotation, is the carrier signal. Deviations from the carrier represent information.

Figure 3A:
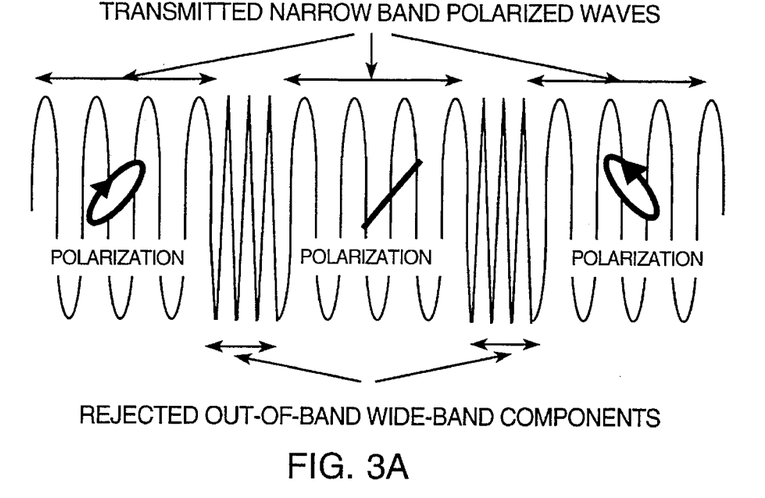
FIG. 3A. is a representation of polarization hopping spread polarization communications.
Figure 3B:
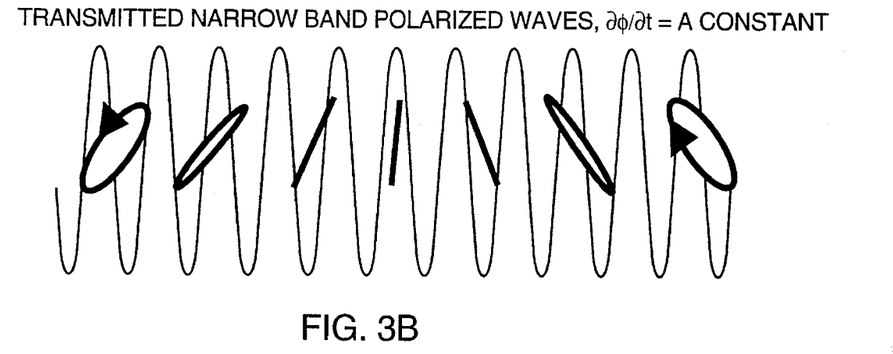
FIG. 3B. is a representation of analog polarization modulation spread polarization communications. (Information is encoded as deviation from the carrier sequence.)

Spread polarization or polarization modulated (polarization hopping) signals which permit information transmission through narrow-band crossed-polarized dual feed antenna components are illustrated in FIG. 3A is a representation of polarization hopping mode spread polarization communication, crossed dipole, dual feed and narrow-band antennas are assumed for this embodiment. Each set polarization, $\phi$=a constant, is transmitted through narrow-band components. Three polarization settings are shown in FIG. 3A. In the polarization hopping mode of functioning, the change from one setting to another ($d\phi/dt$) introduces wide frequency-bandwidth components which are not transmitted through the narrow-bandwidth antennas. The wide frequency bandwidth components are rejected by transmit/receive switching of the system. Two such rejections are shown here. The information carrier is thus a set sequence of polarization settings, e.g., $\phi_1, \phi_2, \phi_3, \phi_4, \ldots, \phi_n, \phi_1, \phi_2, \ldots$ etc. and information is encoded as deviation from the carrier sequence. The information is contained in the instantaneous polarization settings. Thus, although, over time, there is a continuous modulation, i.e., a $d\phi/dt$, only the instantaneous polarization settings are sampled by both the transmit and receive antennas. These antennas can therefore be narrow-band because they do not transmit the phase changes but only the instantaneous phase. The analog mode of functioning is represented in FIG. 3B. Cross-dipole dual-feed, one wide and one narrow, band antennas are assumed. Information is encoded as deviation from the carrier sequence.

The capacity of an informational channel is:

$$C = B \log (1 + S/N) \tag{1}$$

where B is bandwidth. It should be noted that the term bandwidth can refer to: simultaneous bandwidth—as in the case polarization capacity, polarizations/cycle or information display capacity; and also sequential bandwidth—as in the data rate of information transmission or bits/sec. The distinction is important in a description of the procedures of the present invention. For example, if a polarization modulation receiver can discriminate a large number, M, of different polarizations but that, due to high Q antennas, only one signal per second can be transmitted, then the average rate of information transfer is:

$$\log M \geq B_1 \log (1+S/N), \quad (2)$$

which is the case of a high simultaneous bandwidth or polarization capacity but low sequential bandwidth or data rate of transmission. Now suppose a second situation in which the polarization modulation receiver can only discriminate a small number of different polarizations, M, but its rate of information transmission is high, then the average rate of information transmission is:

$$\log M \leq B_2 \log (1+S/N), \quad (3)$$

which is the case of low simultaneous bandwidth or polarization modulation but high sequential bandwidth or data rate of transmission. In terms of the the average rate of transmission there is no difference in channel capacity between a first system which transmits at 10 bits every second, and one that transmits at 1 bit every 0.1 sec.s. However, this difference is pivotal to achieving communications through narrow (instantaneous bandwidth) antennas.

The major issue is: (i) If polarization modulation or rate of change is slow, but the capacity for discriminating many modulations is high (using a fine-grain polarization modulation receiver), then narrow (frequency) bandwidth (high Q, miniaturized) antennas can be used for transmit and receive. This is the polarization hopping mode of functioning of the present invention. (ii) If, on the other hand, polarization modulation is fast then wide (frequency) bandwidth (low Q and ½ λ) antennas are required for transmit and receive. This is the analog mode of functioning of the present invention. A fast, dispersionless, high-grain polarization modulator and a fast, high grain receiver, permit the choice of (i). With a large repertoire of polarization discriminations, M, and if the polarization hopping is moderately fast, with the antennas not transmitting during the slew time, then choice (i) is equal to choice (ii). With a large repertoire of polarization discriminations, M, if the polarization hopping is fast and if the antennas do not transmit during the slew time, then choice (i) is superior to choice (ii).

The polarization conditions possible for the transmit and receive subsystems are as follows (McCormick, 1990; McCormick & Hendry, 1975, 1979, 1982, 1985; Giuli, 1986; Mott, 1986). If the complex vector is defined as:

$$E(r)=E'(r)+iE''(r), \quad (4)$$

then the harmonic vector is:

$$E(r,t)=\mathrm{Re}[E(r) \exp [i\omega t]]. \quad (5)$$

If E is transformed to a new set of axes defined by the orthogonal real vectors, m and n:

$$E=E'+iE''=(m+in) \exp [i\theta], \quad (6)$$

then:

$$E'=m \cos \theta - n \sin \theta, $$

$$E''=m \sin \theta + n \cos \theta, \quad (7)$$

where $$m=E' \cos \theta + E'' \sin \theta,$$

$$n=-E' \sin \theta + E'' \cos \theta, \quad (8)$$

and θ is defined by the transformation:

$$\tan 2\theta = \{2E' \circ E''\}/\{|E'|^2-|E''|^2\}. \quad (9)$$

τ is the tilt (rotation) polarization angle and the auxiliary angle, α, is defined by:

$$\tan \alpha = |E_y|/|E_x|. \quad (10)$$

Therefore $$\tan 2\tau = \tan 2\alpha \cos \phi \quad (11)$$

defines the rotation or tilt angle in terms of the field component magnitudes and the phase difference.

If another auxiliary angle, δ, is defined by:

$$\tan \delta = \pm n/m, \quad -\pi/4 \leq \delta \leq \pi/4, \quad (12)$$

then:

$$\sin 2\delta = \pm\{2mn\}/\{m^2+n^2\}. \quad (13)$$

As $$\pm mn = -|E_x||E_y|\sin \phi, \quad (14)$$

then:

$$\sin 2\delta = \{2|E_x||E_y|\} \sin \phi/\{|E_x|^2+|E_y|^2\} \quad (15)$$

which gives the axial ratio, n/m, from the field component magnitudes and phase difference (Mott, 1986).

The rotation sense of E is as follows. The time-varying angle of E is:

$$\psi=\tan^{-1}\{E_y/E_x\}=\tan^{-1}\{[|E_y|\cos (\beta+\phi_y)]/[|E_x|\cos (\beta+\phi_x)]\}, \quad (16)$$

where $$\beta=\omega t-kz. \text{ Then:}$$

$$\partial\psi/\partial\beta=\{(|E_y|/|E_x|)[-\cos (\beta+\phi_x) \sin (\beta+\phi_y)+\sin (\beta+\phi_x) \cos (\beta+\phi_y)]\}/ \{1+|E_y|^2 \cos^2 (\beta+\phi_y)/|E_x|^2 \cos^2 (\beta+\phi_x)] \cos^2 (\beta+\phi_x)\}, \quad (17)$$

where $\partial\psi/\partial\beta>0$ corresponds to clockwise (corotation) rotation, and $\partial\psi/\partial\beta<0$ corresponds to counterclockwise (contrarotation) rotation.

From Eq. (1):

$$\sin 2\alpha = \{2|E_x||E_y|\}/\{|E_x|^2+|E_y|^2\}, \quad (18)$$

so that:

$$\sin 2\delta = \sin 2\alpha \sin \phi. \quad (19)$$

Therefore, from a knowledge of the field components $|E_x|$ and $|E_y|$ and their phase difference $\phi=\phi_y-\phi_x$, the auxiliary angle, α, can be found from Eq. (10); the tilt or rotation angle, τ, from Eq. (11); the auxiliary angle, δ, from Eq. (19); and the axial rotation and sense of rotation from Eq. (12) (cf. Mott, 1986).

The Stokes' parameters are:

$$S_0=|E_x|^2+|E_y|^2,$$

$$S_1=|E_x|^2-|E_y|^2,$$

$$S_2 = 2|E_x||E_y|\cos \phi,$$

$$S_3 = 2|E_x||E_y|\sin \phi, \quad (20)$$

giving:

$$S_0 = S_1^2 + S_2^2 + S_3^2. \quad (21)$$

The following equation relates the Stokes' parameters to the previously defined angles:

$$\sin 2\delta = S_3/S_0, \quad (22)$$

and $$\tan 2\tau = S_2/S_1. \quad (23)$$

Other relations are:

$$\phi = \tan^{-1} S_3/S_2, \quad (24)$$

$$|E_x| = \sqrt{[\tfrac{1}{2}(S_0 + S_1)]}, \quad (25)$$

$$|E_y| = \sqrt{[\tfrac{1}{2}(S_0 - S_1)]}, \quad (26)$$

$$p = [-S_3 - iS_2]/[S_0 + S_1] = [-\sin 2\delta + i \cos 2\delta \sin 2\tau]/[1 + \cos 2\delta \cos 2\tau], \quad (27)$$

$$q = [-S_1 - iS_2]/[S_0 - S_3] = [\cos 2\delta \cos 2\tau - i \cos 2\delta \sin 2\tau]/[1 - \sin 2\delta], \quad (28)$$

$$2\delta = \sin^{-1} S_3/S_2, \quad (29)$$

$$2\tau = \tan^{-1} S_2/S_1. \quad (30)$$

Figure 4:
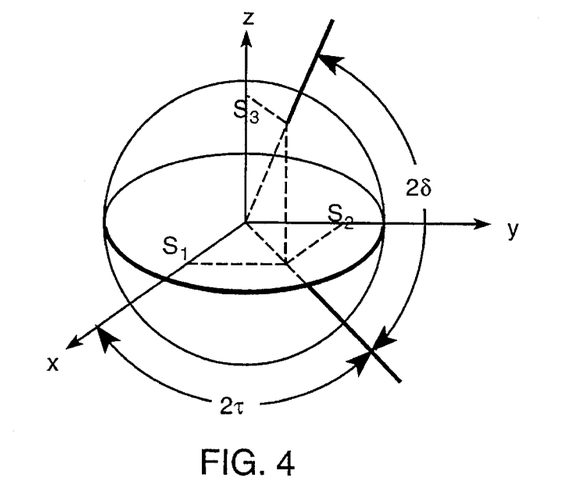
FIG. 4. illustrates a Poincaré sphere in Stokes' parameter form.

Using the definitions:

$$S_0 = |E_x|^2 + |E_y|^2, \quad (31)$$

$$S_1 = S_0 \cos 2\delta \cos 2\tau, \quad (32)$$

$$S_2 = S_0 \cos 2\delta \sin 2\tau, \quad (33)$$

$$S_3 = S_0 \sin 2\delta, \quad (34)$$

the Stokes' parameter definition of the Poincaré sphere is obtained and illustrated in FIG. 4.

Figure 5:
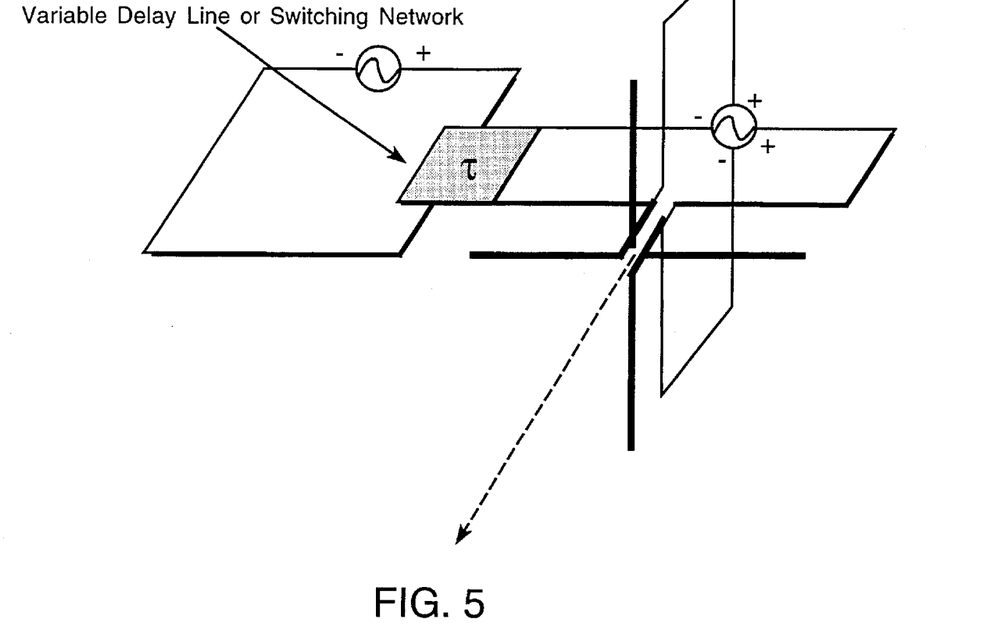
FIG. 5. shows a dual-feed crossed polarized antenna system based on a narrow-frequency bandwidth (vertically polarized) component and a narrow-frequency bandwidth phase modulated (horizontally polarized) component with rejection of $\partial \psi / \partial \beta$ providing a broad-polarization instantaneous $\phi$ bandwidth for point-to-point communications.

The conditions of radiation polarization represented on the Poincaré sphere in FIG. 4 are transmitted from an orthogonally polarized transmit and receive system. An embodiment of a transmit system is shown in FIG. 5. In the hopping mode, due to the resulting high Q from antenna dielectric-ferrite loading, the sampling and transmission is of the absolute discrete phase differences $\Delta\phi_1, \Delta\phi_2, \Delta\phi_3, \ldots$ at discrete intervals, rather than of analog continuous $d\phi/dt$ which increase the antenna frequency bandwidth requirements denied by the miniaturization. Thus the antenna with the delay circuit acts as a bandpass filter set by its Q. The receive system is also limited by the Q of the receive antennas and the sampling bandwidth of the cross-correlator receiver.

Figure 6:
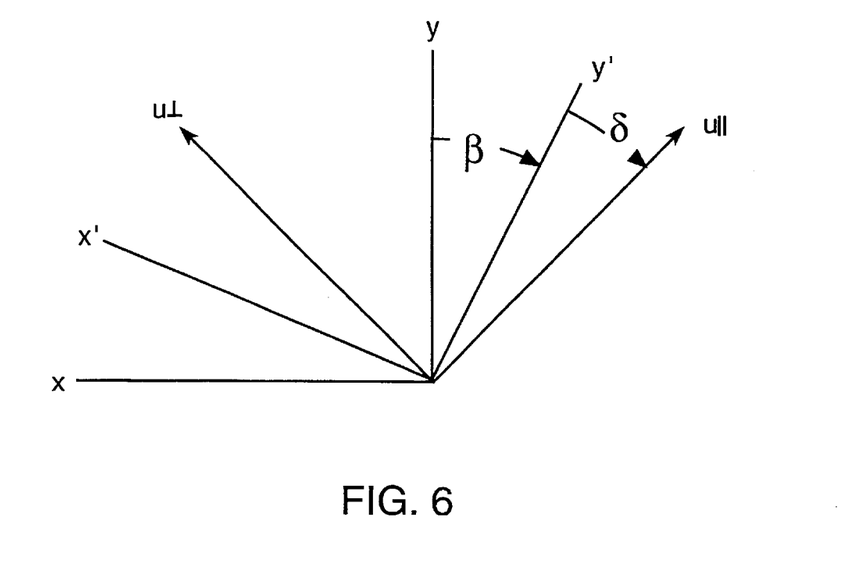
FIG. 6. illustrates the coordinates for waveguide system of FIGS. 5 and 6.

For reference purposes FIG. 6. shows rotation for angular displacement through an angle $\beta$ of the axes from x to x' and from y to y'. The phase delay is shown as an angle $\delta$ and $u_{||}$ and $u_A$ are unit vectors in the plane and perpendicular to the plane of the instantaneous orientation of the wave.

The far-field transmitted by the crossed-dipole is:

$$E(\beta,\delta) = E_{||} u_{||} + i E_\perp u_\perp, \quad (35)$$

where are the relative field strengths relative to the instantaneous orientation of the transmitted wave, and $$u_{||} = \cos(\beta+\delta)u_y - \sin(\beta+\delta)u_x, \quad (36)$$

$$u_A = \sin(\beta+\delta)u_y - \cos(\beta+\delta)u_x. \quad (37)$$

In terms of the crossed dipole components, the transmitted wave is:

$$E(\beta,\delta) = \cos \delta[\cos(\beta+\delta)u_y - \sin(\beta+\delta)u_x] + \exp[i\pi/2] \sin \delta [\sin(\beta+\delta)u_y - \cos(\beta+\delta)u_x], \quad (38)$$

and the circular polarization ratio is:

$$q = \exp[-i(2\beta + 2\delta + \pi]\cot(\delta + \tfrac{1}{4}\pi). \quad (39)$$

The present invention also permits more advanced forms of encoding. Utilizing the the Poincaré sphere representation, the elementary forms of encoding are for the polarization-rotation modulations: $d\phi/dt$=constant; $dr/dt$=constant. The advanced forms of encoding are for $d\phi/dt = f(t)$; $dr/dt = f(t)$; and also $d\phi^n/dt^n$=constant; $dr^n/dt^n$=constant; and $d\phi^n/dt^n = f(t)$ and $dr^n/dt^n = f(t)$. The advanced forms permit an enormous number of codes for the (polarization-rotation) carrier, $CAR_{PR}$—quite apart from the codes for the time domain sequencing carrier, $CAR_{TD}$.

Figure 7:
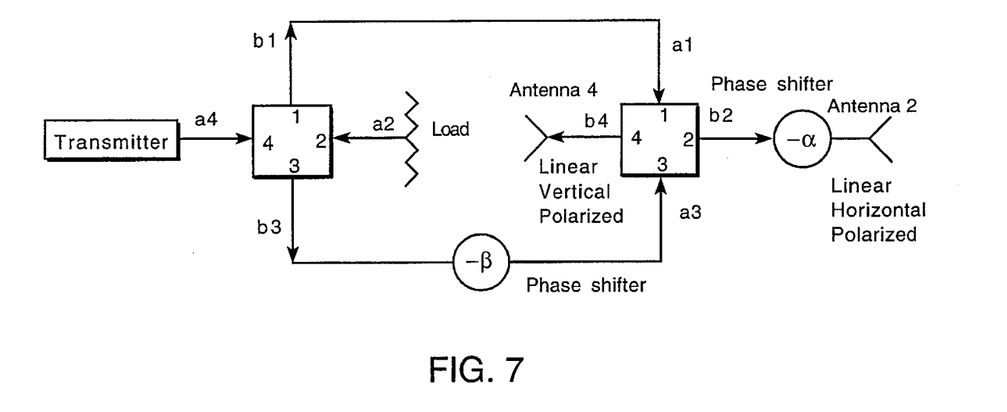
FIG. 7. shows a dual-feed crossed polarized transmitting antenna system. After Mott (1986) p. 197.
Figure 8:
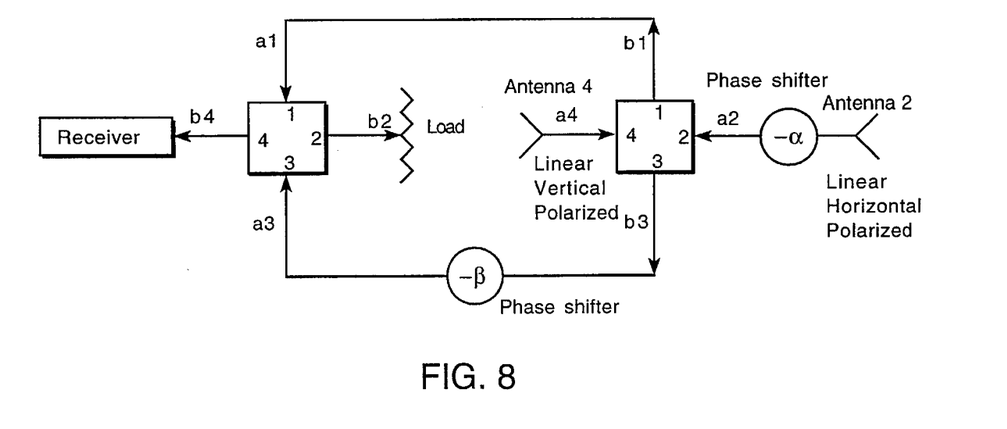
FIG. 8. shows a dual-feed crossed polarized receiving antenna system. After Mott (1986) p. 197.

Optimized Systems for Transmit and Receive:

The embodiment of transmit and receive systems of the present invention differ from the embodiment of systems of prior art only with respect to the modulation procedures provided by the present invention. Therefore systems of prior art can be adapted to perform the procedures of the present invention. Embodiments of the present invention are shown in FIGS. 7 and 8, which are also embodiments of prior art (Mott, 1986) when procedures of prior art are used. As an example of transmit and receive systems of the present art: fixed, not modulated polarization transmit and receive systems of prior art by Mott (1986) can be modified to performed polarization-rotation modulation. FIGS. 7 and 8 show crossed polarized antenna systems for transmit and receive. For example, if antenna 4 is vertically polarized, then antenna 2 is horizontally polarized; or, if antenna 4 is circularly polarized corotating, then antenna 2 is circularly polarized contrarotating.

Referring to FIG. 7: if the setting is such that $$\phi + \alpha = \pm(\tfrac{1}{2})\pi, \quad (40)$$

$$b = \pi \pm 2 \tan^{-1}(b/a), \quad (41)$$

where the emitted wave is:

$$E_e = E_0(u_x a + u_y b \exp[i\phi]) \quad (42)$$

then the inputs to the left hybrid are:

$$a_2 = 0, \quad (43)$$

$$a_4 = 1, \quad (44)$$

and the outputs from the left hybrid are:

$$b_1 = (1/\sqrt{2})(a_2 + a_4) = (1/\sqrt{2}), \quad (45)$$

$$b_3 = (1/\sqrt{2})(-a_2 + a_4) = (1/\sqrt{2}). \quad (46)$$

The inputs to the right hybrid are:

$$a_1 = (1/\sqrt{2}), \quad (47)$$

$$a_3 = b_3 \exp[-i\beta], \quad (48)$$

and the outputs from the right hybrid are:

$$b_2 = (1/\sqrt{2})(a_1 - a_3), \quad (49)$$

$b_4 = (1/\sqrt{2})(a_1 + a_3)$, (50)

The waves transmitted are:

$E_x = b_2 \exp[-i\alpha]$, (51)

$E_y = b_4$. (52)

Referring to FIG. 8: the incident wave is:

$E_i = E_0(u_x a + u_y b \exp[i\phi])$ (53)

and the inputs on the right hybrid are:

$a_2 = a \exp[-i\alpha]$, (54)

$a_4 = b \exp[-i\phi]$. (55)

The outputs on the right hybrid are:

$b_1 = (1/\sqrt{2})(a_2 + a_4) = (1/\sqrt{2})(a \exp[-i\alpha] + b \exp[i\phi])$, (56)

$b_3 = (1/\sqrt{2})(-a_2 + a_4) = (1/\sqrt{2})(-a \exp[-i\alpha] + b \exp[i\phi])$. (57)

The inputs on the left hybrid are:

$a_1 = b_1 = (1/\sqrt{2})(a \exp[-i\alpha] + b \exp[i\phi])$, (58)

$a_3 = b_3 \exp[-i\beta] = (1/\sqrt{2})(-a \exp[-i\alpha] + b \exp[i\phi]) \exp[-i\beta]$. (59)

The outputs on the left hybrid are:

$b_2 = (1/\sqrt{2})(a_1 - a_3) = (½)(a \exp[-i\alpha] + b \exp[i\phi] - \exp[-i\beta](-a \exp[-i\alpha] + b \exp[i\phi]))$, (60)

$b_4 = (1/\sqrt{2})(a_1 + a_3) = (½)(a \exp[-i\alpha] + b \exp[i\phi] + \exp[-i\beta](-a \exp[-i\alpha] + b \exp[i\phi]))$, (61)

If $\phi + \alpha = \pm(½)\pi$, (62)

and $b_2 = 0$, (63)

then $a \pm ib + \exp[-i\beta](a \pm ib) = 0$, (64)

which gives $b = \pi \pm 2 \tan^{-1}(b/a)$ (65)

and $|b_4|^2 = a^2 + b^2 = 1$. (66)

Thus, by choice of $\alpha$ and $\beta$, all of the energy is directed to port 4 of the hybrid on the left for both transmission and reception. Furthermore, the polarization ratio of the transmitted wave is the conjugate of the polarization ratio of the received wave. Using such configurations the fixed polarization compatability between transmit and receive systems of prior art can be optimized (Mott, 1986). Systems of the present invention differ from this prior art in that the object of the present invention is to achieve polarization modulated and rotation modulated radiation rather than fixed polarization radiation.

Comparisons with Prior Art:

Polarization modulation of the present art is different from other modulation forms of prior art. Amplitude modulation is defined by:

$E = E_c(1 + M \sin \omega_m t) \sin \omega_c t$, (67)

where is the peak carrier voltage, and $\omega_c$ and $\omega_m$ are the radian frequencies of the carrier and modulating signals, respectively. The modulating index, M, may have the values from zero to one. With the trigonometric identity:

$\sin a \sin b = (½) \cos(a-b) - (½) \cos(a+b)$ (68)

is used, this equation becomes:

$E_{out} = E_c \sin \omega_c t + [ME_c/2] \cos(\omega_c - \omega_m)t - [ME_c/2] \cos(\omega_c + \omega_m)t$, (69)

showing that new frequencies, the side bands, are generated by the amplitude modulation process. Amplitude modulation is achieved by mixing the carrier and modulating signals in a nonlinear device such as a vacuum tube or transistor amplifier operating in the nonlinear regime of its characteristics.

Frequency modulation is proportional to the amplitude of the modulating signal:

$E_{out} = E_{in} \sin[\omega_c t + \{\Delta\omega/\omega_m\} \sin \omega_m t]$, (70)

where $\Delta w$ = the peak variation of the carrier wave frequency away from the frequency, $\omega_c$, caused by the modulation; $\omega_c$ = frequency of the unmodulated carrier wave; $\omega_m$ = frequency of the modulating signal; and $\Delta\omega/\omega_m$ is the deviation ratio.

Phase modulation is a technique resulting in a deviation ratio which is independent of the modulating frequency, while the frequency modulation technique results in a deviation ratio which is inversely proportional to the modulating frequency. The equation describing phase modulation is:

$E_{out} = E_{in} \sin[\omega_c t + K \sin \omega_m t]$, (71)

where K is independent of $\omega_m$. The phase modulating techniques can be used to produce frequency modulated waves, provided the amplitude of the modulating voltage is inversely proportional to the modulating frequency, i.e., $= \Delta\omega/\omega_m$. This inverse relationship can be obtained by including, in the modulator, a circuit which has a voltage transfer ratio inversely proportional to the frequency.

In the case of polarization modulation of the present invention, orthogonally polarized antennas, or a dual-feed, orthogonally polarized antenna, must be used. Then:

$E_{out} = E_{in} M \sin[\omega_c t]$, (72)

where M is a Pauli matrix over the volume x,y,z.

With a single-feed antenna, only phase modulation can be transmitted and the antenna must be wideband. However, with a double-feed orthogonally polarized antennas the polarization modulated input can be transmitted through narrow-band components if it is transmitted in a hopping mode, i.e., only the instantaneous polarization is transmitted and the slew, $d\phi/dt$, is blocked from transmission. The polarization modulated field components for the analog mode of functioning are:

$E(z,t) = |E_x|\cos(\omega_c t - 2\pi z/\lambda + \delta_x)x + |E_y|\cos(\omega_c t - 2\pi z/\lambda + \delta_y)y$, (73)

$E(z) = \exp[-i2\pi z/\lambda][|E_x|\exp[i\delta_x], |E_y|\exp[i\delta_y]]$ (74)

$E = [E_x, E_y]$. (75)

If the $|E_y|$ component is chosen to be the referent, then the output from that antenna is narrow-band. The $|E_x|$ component is phase-modulated and in the analog mode is emitted through a broad-band antenna. In the narrow-band (polarization hopping mode) case, during the transition from one phase relation to another, the transmit $|E_x|$ antenna—and the receive $|E_x|$ antenna—are switched to act as narrow-bandpass filters and the phase transition information, $\partial \chi / \partial \beta$, is discarded at the transmission end with only the instantaneous phase relations passed through the transmit antenna. The transmitted information is represented in the instantaneous phase, $\phi(t)$, and its bandwidth, $\Delta \phi$, not in the $\partial \phi / \partial t$ rate, which, due to the restriction to narrow-band transmit and receive antennas is discarded or not sampled. The informational data rate is as high as the $\Delta \phi$ discrimination capacity of the cross-correlator ($\leq 20$ GHz) set by the coding repertoire.

A major difference between polarization modulation of the present invention, whether analog or hopping mode, and other modulations of prior art is that radiation is polarization modulated to have a variation in the three x,y and z spatial dimensions, whereas FM, AM and phase modulated radiation has a variation only in the two x,y spatial dimensions. Frequency modulation which results from the reception of (analog) polarization modulation only occurs if the x,y,z variation is sampled in the x,y plane, rather than the x,y,z volume, i.e., if a wave varying in the x,y,z volume is sampled by a single-feed unipolarized x,y plane antenna. The sampling of an omnipolarized antenna does not create frequency modulation.

Signal-to-Noise Considerations:

In the case of polarization modulation communications of the present invention, the probability of signal detection is based on an analysis similar to that used for frequency, amplitude or phase modulation detection of prior art. A random variable, $x(t)$, is defined:

$$x^2_{AV}(t) = N_0 f_B, \tag{76}$$

where the two-sided noise power density is $N_0/2$ and $f_B$ is the noise bandwidth. If $a$ is the average of $x(t)$, then a representative power density spectrum is given by:

$$\Phi(x) = [1/\beta(2\pi)^{1/2}] \exp[-(x-a)^2/2\beta^2], \tag{77}$$

where $\beta$ is the standard deviation defined:

$$\beta = (N_0 f_B)^{1/2}. \tag{78}$$

If $$x = r \cos \phi, \tag{79}$$

for $$r = (x^2 + y^2)^2, \tag{80}$$

$$\phi = \arctan[y/x], \tag{81}$$

and if $$y = r \sin \phi, \tag{82}$$

with average, B, then the noise is defined as:

$$n_0(t) = x(t) \cos(\omega_0 t) + y(t) \sin(\omega_0 t), \tag{83}$$

where $\omega_0$ is the average frequency of the noise. The representative noise power density spectrum then becomes:

$$\Phi(r,\phi) = (r/2\pi\beta^2) \exp[-(r^2 + A^2 + B^2 - 2ra \cos \phi - 2rb \sin \phi)/2\beta^2]. \tag{84}$$

The criterion for a detection is whenever a threshold, $V_T$, is exceeded, i.e., $r > V_T$. Detection thresholds are obtained by integrating the probability density function over all phases to obtain the probability density function of the envelope and then integrating the area under the obtained curve. The probability of a false alarm is then:

$$P_{FA} = \int_{VT}^{\infty} (r/\beta^2) \exp[-r^2/2\beta^2] dr = \exp[-V_T^2/2\beta^2], \tag{85}$$

or integrating the probability density function for noise from threshold to infinity. Similarly, the probability of detection is equal to the area under the probability density function of the envelope for the signal from threshold to infinity.

If the S/N >> 1, the probability of a signal detection is:

$$P_D = P(V_T < r < \infty) \ \& \ (\tfrac{1}{2})[1 - erf\{V_T/(\beta\sqrt{2}) - (SNR)^{1/2}\}]. \tag{86}$$

Figure 9:
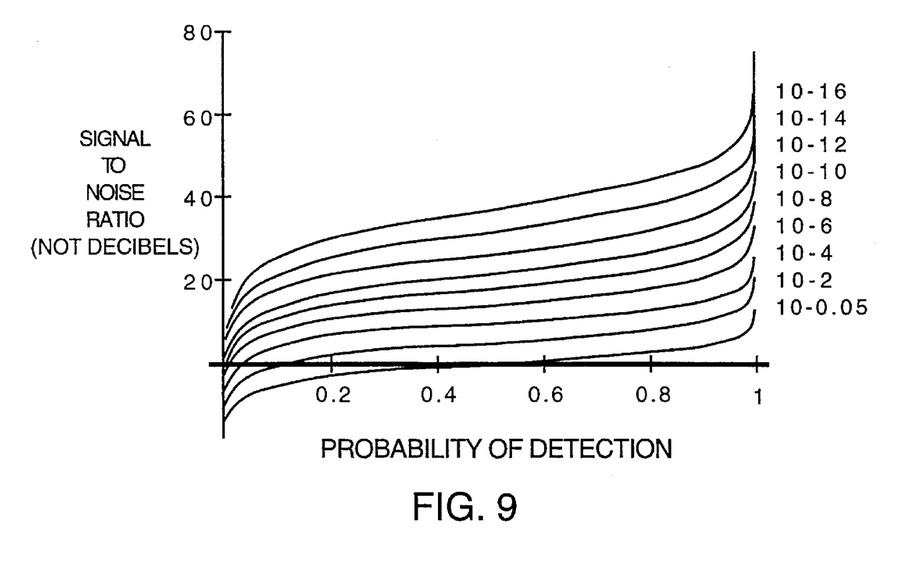
FIG. 9. shows single pulse detection: signal-to-noise ratio (not in decibel form) versus probability of detection at various probabilities of false alarm.

The relation between the signal-to-noise ratio (not in decibels), the probability of detection and the probability of false alarm is shown in FIG. 9.

The difference between this detection analysis for polarization modulated signals of the present invention and that for amplitude, frequency or phase modulated signals of prior art is that the detection of polarization modulated signals and phase modulated signals are detections on the basis of the phase spectrum, whereas frequency and amplitude modulation detection is on the basis of the signal envelope. Use of polarization modulated signals of the present invention also requires cross-correlation of the the two orthogonally polarized receive antenna inputs.

If the transmitter and antenna radiates $P_t$ watts of power and the energy is radiated isotropically (omnidirectionally), i.e., the transmit antenna is a point source, then the power density per unit area at a distance R from the target is the total power, $P_t$, on the surface of an imaginary sphere, centered at the point source, divided by the total surface area, $4\pi R^2$.

Therefore, at a range, R, from the receiver, the power density is:

$$\text{Power density} = P_t / 4\pi R^2 \ W/m^2. \tag{87}$$

With replacement of the omnidirectional antenna with a directional antenna with power gain, $G_t$, a directional beam of energy is produced and the power density within the beam at range R is then:

$$\text{Power density with antenna gain} = P_t G_t / 4\pi R^2 \ W/m^2. \tag{88}$$

If, crossed-dipole antennas and receivers are located within the directed beam at a range R from the source, some of the energy is collected and the power density of the transmitted wave arriving before the receive antennas is:

$$P_t G_t / [4\pi]^2 R^2 \ W/m^2. \tag{89}$$

The effective capture area and gain of the crossed-dipole receiving antennas is:

$$G_r = 4\pi A_e / \lambda^2, \tag{90}$$

Therefore the power received, $P_r$, is:

$$\text{Power received: } P_r = P_t G_t G_r \lambda^2 / [4\pi]^3 R^2 \ W. \tag{91}$$

The system loss factor at 290° K. is:

$$F_n = [N_o/N_i]/[S_o/S_i] = (SNR)_i/(SNR)_o, \tag{92}$$

where SNR is signal-to-noise ratio.

The thermal noise at the receiver is:

$$N_i = kTB,  \quad (93)$$

where B is the receiver bandwidth. If L represents all signal losses, both external and internal to the radar, and if A represents the receiver signal power gain, then:

$$S_o = AP_r/L; \; N_o = AF_n kTB;$$

$$(S_o/N_o) = P_r/LF_n kTB. \quad (94)$$

Expanding the last expression, gives:

$$(S_o/N_o) = P_t G_t G_r \lambda^2 / [4\pi]^3 R^2 LF_n kTB \; W/W. \quad (95)$$

The maximum detection range is then:

$$R_{max} = [P_t G_t G_r \lambda^2 / [4\pi]^3 LF_n kTB(S_o/N_o)_{min}]^{1/2} m. \quad (96)$$

Substituting for the receive aperture gain, gives:

$$R_{max} = [P_t G_t A_e / [4\pi]^2 LF_n kTB(S_o/N_o)_{min}]^{1/2} m. \quad (97)$$

Defining this maximum range in terms of energy transmitted requires insertion of the signal duration, $\tau$, explicitly in the numerator (to give $P_t \tau$ (W×time=E)), and implicitly in the $S_o/N_o$ term of the denominator (to give {W×time}/{W× time} or dimensionless number):

$$R_{max} = [P_t G_t A_e \tau / [4\pi]^2 LF_n kTB(S_o/N_o)_{min}]^{1/2} m. \quad (98)$$

Thus the signal-to-noise and range for the polarization modulation communication system of the present system is determined in the same way as for other modulated communications systems. Instrumentation noise is determined in the same way for all systems. Environmental noise for a point-to-point system should be less in the atmosphere, as the atmosphere, unlike the ionosphere, does not disturb polarization. However, this advantage will only become apparent with transmission over long range. Transmission through the ionosphere can also be achieved by using a probing signal to ascertain the polarization modulation of the channel and making compensatory adjustments.

Figure 10A:
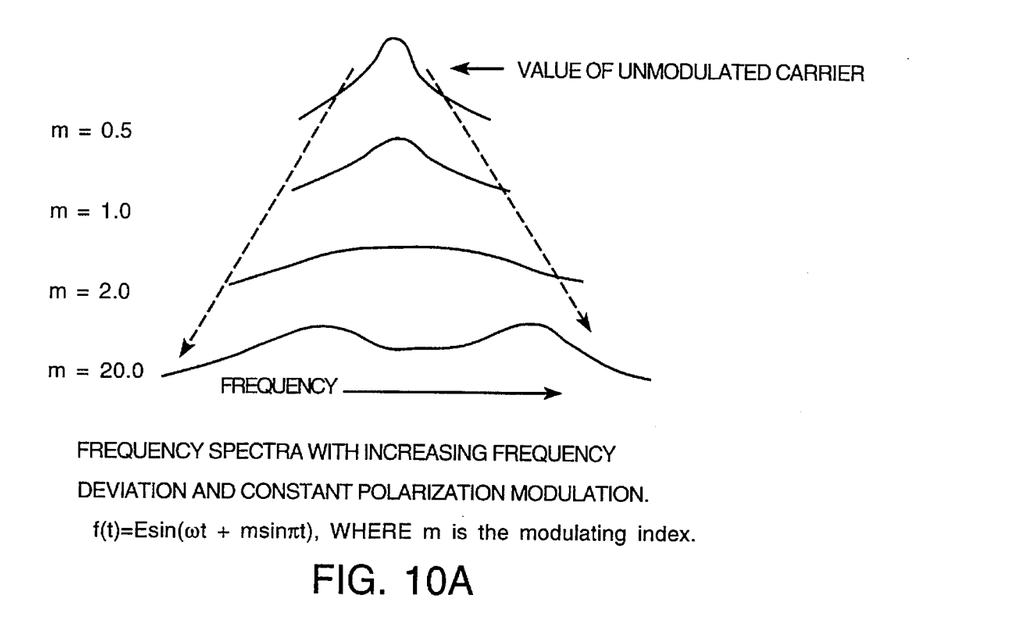
FIG. 10. illustrates two uses of polarization modulation for spread signal results according to the invention.
Figure 10B:
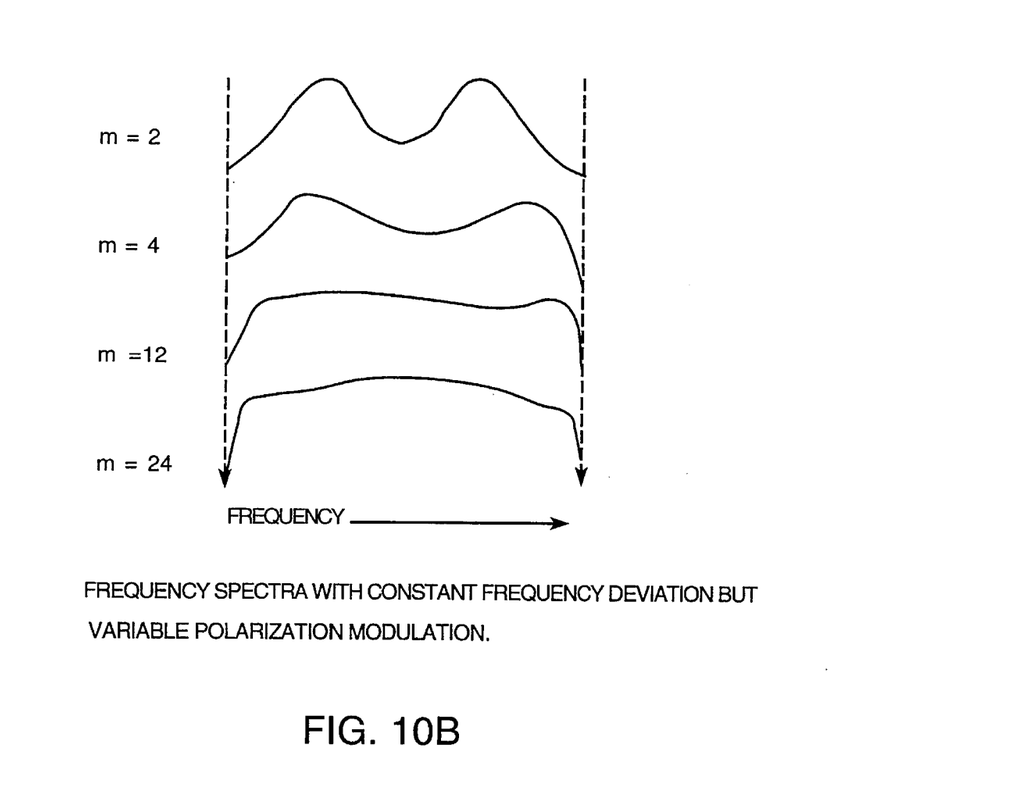

Spread Polarization Considerations:

Communication systems of prior art are unipolarized, i.e., the system antennas transmit and receive at a set polarization. Communications systems of the present invention are omnipolarized systems and therefore will be spread in polarization with respect to conventional systems in a number of ways. FIG. 10. contrasts the increasing frequency bandwidth (A) which occurs with analog polarization modulation in which sampling with crossed-polarized wideband antennas is continuous and the $d\phi/dt$ slewing is detected, with the constant frequency-bandwidth condition (B) which occurs with polarization hopping in which sampling with the cross-polarized narrowband antennas is discrete and only the instantaneous $\phi$ values are transmitted and received.

Figure 11A:
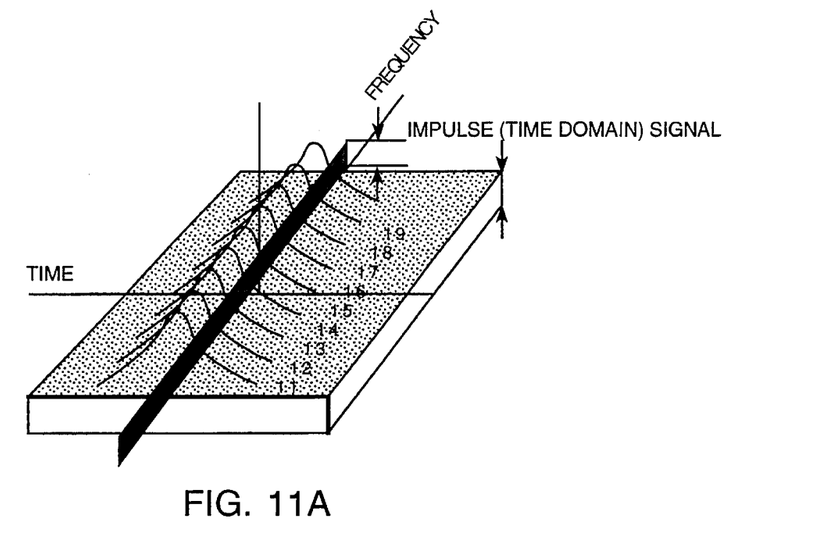
Figure 11B:
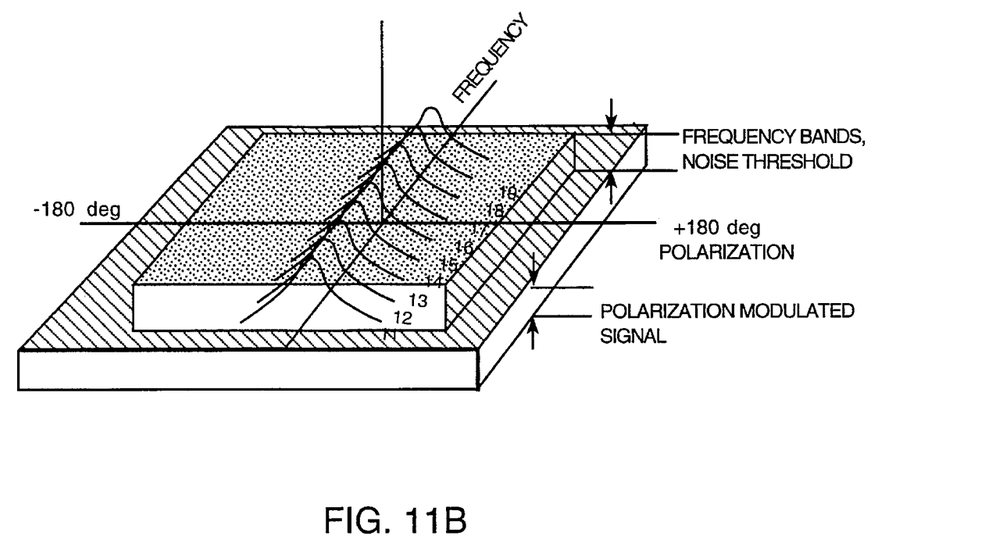
FIG. 11(B) is a representation of short duration polarization modulated spread polarization pulse below the threshold for detection by unipolarized (0°) frequency domain receivers. (A Polarization Modulated Pulsed Interval Modulated (POMPIM) pulse uses both (A) and (B) to obtain spread polarization below frequency domain detection limits.)

The systems of the present invention can be either continuous wave (analog mode) or pulsed (polarization hopping mode). A pulsed system would offer additional advantages in the spread signal sense. FIG. 11 illustrates the frequency spread of a polarization modulated pulse in a time-frequency plot. In (A), a short duration spread polarization pulse is shown below the signal threshold for detection by frequency domain receivers. In (B), a short duration polarization modulated or spread polarization pulse is shown below the threshold for detection by unipolarized (0°) frequency domain receivers. A Polarization Modulated Pulsed Interval Modulated (POMPIM) pulse uses both (A) and (B) to obtain spread polarization below frequency domain detection limits.

Figure 12:
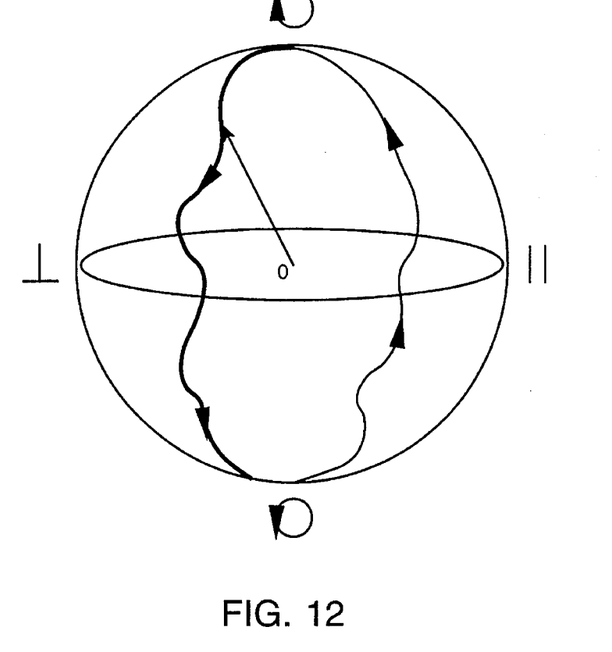
FIG. 12. illustrates a Poincaré sphere representation of signal polarization (longitudinal axis) and polarization rotation (latitudinal axis). (A representational analog trajectory or polarization modulation coding is shown by changes in the unit vector centered at the center of the sphere and pointing at the surface.)
Figure 13:
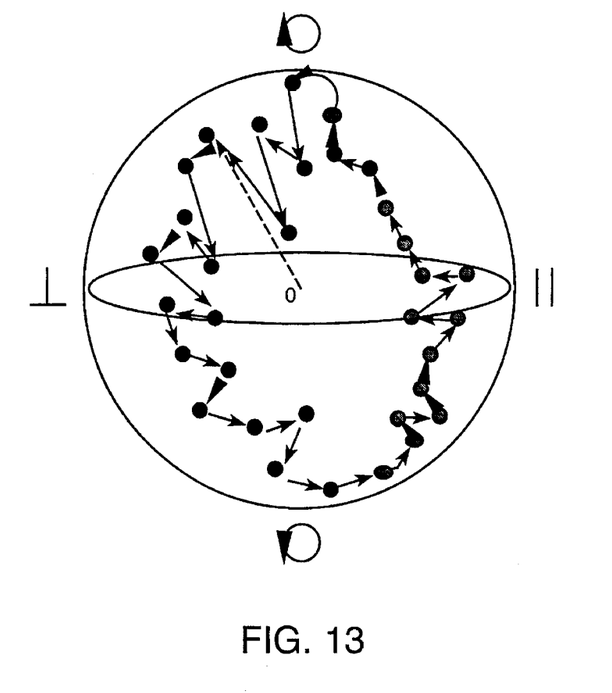
FIG. 13. illustrates a Poincaré sphere representation of signal polarization (longitudinal axis) and polarization rotation (latitudinal axis). A representational hopping trajectory or polarization modulation coding is shown by changes in the unit vector centered at the center of the sphere and pointing at the surface.

Representation of the carrier also illustrates the spread polarization nature of the proposed system. FIG. 12 illustrates a representative analog polarization modulation carrier in a Poincaré sphere representation. The carrier trajectory is followed continuously for continuous wavelength analog operation. For polarization hopping operation the unit vector hops discontinuously from location to location on the surface (FIG. 13). The density of points on the surface is representative of the polarization modulation bandwidth, i.e., of M. FIG. 12 represents medium-frequency bandwidth analog-mode operation and FIG. 13 narrow-frequency bandwidth hopping bandwidth operation—both modes providing wide polarization bandwidth.

SUMMARY

The polarization-rotation modulation approach to communications of the present invention can be compared with linear or circular or elliptical polarization techniques of prior art. Whereas prior art techniques are of static single, or at most, two polarizations, the technique of the present invention are of possibly all polarizations sequentially visited in a well-defined trajectory.

The polarization modulation approach to communications of the present invention can be compared with spread (frequency) spectrum techniques of prior art, especially phase modulation, e.g. phase-shift keying. Firstly, it should be emphasized that whereas the polarization modulation technique of the present invention requires two orthogonally polarized antennas, e.g., crossed narrow-band dipoles, the phase modulation techniques of prior art require only one broad-band antenna which is of one polarization. As the polarization modulation technique of the present invention is spread in polarization, and as the majority of conventional communications antennas are unipolarized (single polarization samplers), then the polarization modulated signals proposed will be spread in polarization to such antennas.

The phase changes occurring with signal phase modulation of prior art are phase changes between two waves of the same polarization and the resultant modulated wave is of the same polarization. In the case of signal polarization modulation of the present invention the phase changes occurring with phase modulation are between two waves (or antennas) of orthogonal polarization and the resultant wave is yet of a changing polarization other than that of the two constituent waves (except under special conditions—one or other of the constituent waves being zero). An advantage in using phase modulation of orthogonally polarized waves producing polarization modulation and sequentially omnipolarized waves, as opposed to phase modulation of unipolarized waves producing unipolarized waves, is that as conventional antenna systems are unipolarized, polarization modulation presents a signal spread in polarization to those conventional antenna systems. Phase modulated systems are unspread in polarization to other systems.

There is a further distinction between a communications system of the present invention and a phase-modulation communications system or a fixed polarization communications system of prior art. Apart from the phase modulation (between orthogonally polarized transmit antennas), a system of the present invention uses signal polarization axis rotation, so that two dimensional trajectories on the Poincaré sphere are possible for the carrier signal.

Application Areas of the Present Invention

The narrow-band antennas used in the polarization hopping mode of functioning of the present invention are small, light-weight antennas, e.g., crossed, orthogonally polarized, dipoles. Such antennas can be used for satellite-satellite, satellite-ground, inlaid-aircraft (Satcom) and even inlaid-automobile-roof (Satcom) antennas.

Applications of both the analog and the polarization hopping mode of functioning of communications systems of the present invention include short, medium and long range communications: ground, ground-to-satellite and satellite-to-ground. Such communications will also be spread polarization and exceedingly covert.

Applications of the present invention include both point-to-point communications and indirect communications. In the case of indirect communications, in which interaction of the radiation with surfaces, the ionosphere, etc, can modulate the signal's polarization and rotation, a medium-interrogating pulse is transmitted so that compensatory adjustments to the expected polarization-rotation signal carrier can be made.

REFERENCES

A., N. Q., Györfi, L. & Massey, J. L., Constructions of binary constant-weight cyclic codes and cyclically permutable codes. *IEEE Trans. on Information Theory*, 38, 940–949, 1992.

Allen, L. E. & McCormick, G. C., "Measurements of the backscatter matrix of dielectric spheroids", *IEEE Trans. Antennas & Propag.*, AP-26, pp. 579–587, 1978.

Bellegarda, J. R. & Titlebaum, E. L., Time-frequency hop codes based upon extended quadratic congruences. *IEEE Trans. on Aerospace & Electronic Systems*, 24, 726–742, 1988.

Bellegarda, J. R. & Titlebaum, E. L., The hit array: an analysis formalism for multiple access frequency hop coding. *IEEE Trans. on Aerospace & Electronic Systems*, 27, 30–39, 1991.

Bellegarda, J. R. & Titlebaum, E. L., Amendment to "Time-frequency hope codes based upon extended quadratic congruences", *IEEE Trans. on Aerospace & Electronic Systems*, 27, 167–172, 1991.

Bickel, S. H., "Some invariant properties of the polarization scattering matrix". Proc. IEEE 53, pp. 1070–1072, 1965.

Chatterjee, R., *Dielectric and Dielectric-Loaded Antennas*, Wiley, New York, 1985.

Chung, H. & Kumar, P. V., Optical orthogonal codes—new bounds and an optimal construction. *IEEE Trans. on Information Theory*, 36,866–873, 1990.

Chung, F. R. K., Salehi, J. A. & Kei, V. K., Optical orthogonal codes: design, analysis, and applications. *IEEE Trans. on Information Theory*, 35, 595–604, 1989.

Dixon, R. C., *Spread Spectrum Communications*, 2nd Edition, Wiley, New York, 1984.

Drumheller, D. M. & Titlebaum, E. L., Cross-correlation properties of algebraically constructed Costas arrays. *IEEE Trans. on Aerospace & Electronic Systems*, 27, 2–10, 1991.

Fujimoto, K., Henderson, A., Hirasawa, K. & James, J. R., *Small Antennas*, Wiley, New York, 1987.

Giuli, D., "Polarization diversity in radars", Proc. IEEE 74, pp. 245–269, 1986.

Maric, S. V. & Titlebaum, E. L., A class of frequency hop codes with nearly ideal characteristics for use in multiple-access spread-spectrum communications and radar and sonar systems. *IEEE Trans. on Comm.*, 40, 1442–1447, 1992.

McCormick, G. C., The theory of polarization diversity systems. *J. Electromagnetic Waves and Applications* 4, 707–725, 1990.

McCormick, G. C. & Hendry, A., Principles for the radar determination of the polarization properties of precipitation. *Radio Science*, 10, pp. 421–434, 1975.

McCormick, G. C. & Hendry, A., Techniques for the determination of the polarization properties of precipitation. *Radio Science* 14, pp. 1027–1040, 1979.

McCormick, G. C. & Hendry, A., "Comments on 'Polarization dependence on electromagnetic inverse problems'", *IEEE Trans. Antennas & Propagat.*, AP-30, 1267–1268, 1982.

McCormick, G. C. & Hendry, Optimal polarizations for partially polarized backscatter. *IEEE Trans. Antennas & Propag.*, AP-33, pp. 33–40, 1985.

Mott, H., *Polarization in Antennas and Radar*, Wiley, New York, 1986.

Simon, M. K., Omura, J. K., Scholtz, R. A. & Levitt, B. K., *Spread Spectrum Communications*, 3 Volumes, Computer Science Press, Rockville, Md., 1985.

Sinclair, G., The transmission and reception of elliptically polarized waves. *Proc. IRE*, 38, 1950, 148–151.

Titlebaum, E. L., Time-frequency hop signals Part I: Coding based upon the theory of linear congruences. *IEEE Trans. on Aerospace & Electronic Systems*, AES-17, 490–493, 1981.

Titlebaum, E. L., Maric, S. V. and Bellegarda, J. R., Ambiguity properties of quadratic congruential coding. *IEEE Trans. on A Aerospace & Electronic Systems*, 27, 18–29, 1991.

Titlebaum, E. L. & Sibul, L. H., Time-frequency HOP signals Part II: Coding based upon quadratic congruences. *IEEE Trans. on Aerospace & Electronic Systems*, AES-17, 494–500, 1981.

I claim:

1. A radio wave communication system comprising:

a source of RF signals, a dual feed pair of cross polarized antennas having a common axis and being at orthogonal angles to each other relative to said common axis, and means for coupling said source of RF signals to said pair of cross-polarized antennas including phase modulation means connected between at least one of said pair of cross-polarized antennas and said source for modulating the polarization of RF signals launched by said pair of cross-polarized antennas with an information signal.

2. A radio wave communication system as defined in claim 1 including a receiver pair of cross-polarized antennas having a common axis for receiving radio waves launched by said first mentioned pair of cross-polarized antennas and being at said orthogonal angles to each other relative to said axis.

3. A radio wave communication system as defined in claim 1 or claim 2 in which said radio wave is a continuous wave.

4. A radio wave communication system as defined in claim 1 or claim 2 in which said radio wave is pulsed.

5. A radio wave communication system as defined in claim 1 or claim 2 wherein said phase modulation means cause the polarization of RF signals to effectively rotate the said common axis of said first mentioned pair of cross-polarized antennas.

6. A radio wave communication system as defined in claim 1 or claim 2 wherein said phase modulation means includes a phase shifter.

7. A radio wave communication system as defined in claim 1 or claim 2 wherein said means to phase modulate includes a low loss dispersionless delay in line providing phase delays of fractions of a degree over discrete intervals of time, and cross-correlation means for detecting said fractions of phase delay.

\* \* \* \* \*

UNITED STATES PATENT AND TRADEMARK OFFICE
CERTIFICATE OF CORRECTION

PATENT NO. : 5,592,177
DATED : January 7, 1997
INVENTOR(S) : Terence W. Barrett

It is certified that error appears in the above-indentified patent and that said Letters Patent is hereby corrected as shown below:

<u>In the Assignee:</u>

No information should be contained in the Assignee line. There is no Assignee.

Signed and Sealed this

Second Day of December, 1997

Attest:

BRUCE LEHMAN

Attesting Officer

Commissioner of Patents and Trademarks